July 27, 1965  H. E. JACKSON  3,197,216
ALIGNMENT CONTROL AND SEAL FOR SPLINE DRIVES
Filed July 31, 1962  2 Sheets-Sheet 1

INVENTOR
HOMER E. JACKSON

BY Claude Funkhouser
ATTORNEY

July 27, 1965  H. E. JACKSON  3,197,216
ALIGNMENT CONTROL AND SEAL FOR SPLINE DRIVES
Filed July 31, 1962  2 Sheets-Sheet 2
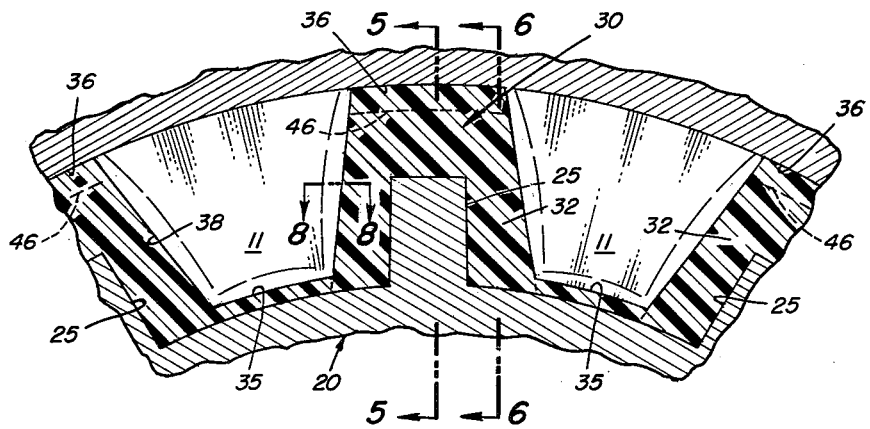
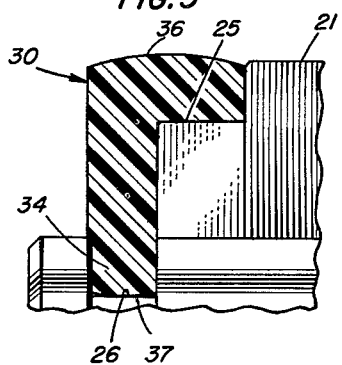
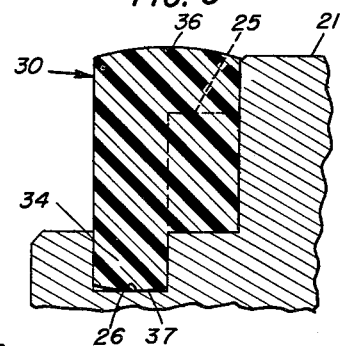
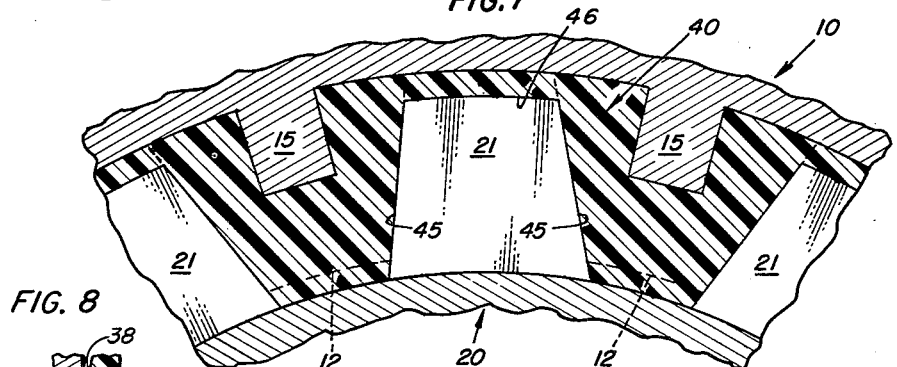
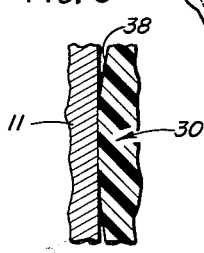
INVENTOR
HOMER E. JACKSON
BY Claude Funkhouser
ATTORNEY United States Patent Office 3,197,216
Patented July 27, 1965

3,197,216
ALIGNMENT CONTROL AND SEAL FOR SPLINE DRIVES
Homer E. Jackson, 3903 Mackall Ave., McLean, Va.
Filed July 31, 1962, Ser. No. 213,834
4 Claims. (Cl. 277—137)
(Granted under Title 35, U.S. Code (1952), sec. 266)

The invention described herein may be manufactured and used by or for the Government of the United States of America for governmental purposes without the payment of any royalties thereon or therefor.

This invention relates generally to seals and more particularly to a seal for spline shafts and spline fittings.

In many applications of spline couplings for power transmittal, the problem of wear is encountered. Excessive wear is usually a result of inadequate control of lubrication, vibration and alignment. The use of "O" rings and stuffing boxes ordinarily required an enclosed spline and fitting with the sealing surface located on the shaft at a point removed from the spline teeth. This arrangement is cumbersome and fails to satisfactorily control wear of the spline. Lubricants from the engine oil system are not ideal for the high pressure, minimum movement applications and cannot be used to best advantage. Often the motion of fuel and engine oils around the coupling wash out the spline lubricant under present engine conditions.

Fretting corrosion occurs when the unit loading of the spline is exceeded, which is caused by imposing a driving load on the corners of opposite splines rather than spline loading along their length. Such fretting corrosion results from vibratory oscillations and misalignment of the spline shaft and fitting under conditions of poor lubrication. Heretofore, the known sealing methods have proved inadequate to provide correct alignment.

Thus, to increase the service life of spline couplings, it is important to retain the lubricant necessary to reduce wear on mated surfaces as well as to absorb shock and provide coupling support so that cyclic loading is minimized and optimum alignment is achieved.

Accordingly, it is an object of the present invention to provide a seal for the prevention of spline coupling lubricant loss.

Another object of the invention is to provide a seal which will insure the fullest possible contact alignment.

Another object of the invention is to provide a seal which will accomplish necessary vibration dampening.

These and other objects and attendant advantages of the present invention will become more readily apparent and understood from the following detailed description and accompanying drawings in which:

FIG. 4 is an enlarged transverse sectional view of a portion of the shaft, fitting and shaft seal taken substantially along the line 4—4 of FIG. 1;

FIG. 5 is a longitudinal sectional view of a portion of the shaft and seal taken substantially along the line 5—5 of FIG. 4;

FIG. 6 is a longitudinal sectional view of a portion of the seal and shaft taken substantially along the line 6—6 of FIG. 4;

FIG. 7 is an enlarged transverse sectional view of a portion of the shaft, fitting and fitting seal taken substantially along the line 7—7 of FIG. 1 and FIG. 8 is a transverse sectional view of a portion of the shaft and seal taken along the lines 8—8 of FIG. 4.

A seal embodying this invention, herein disclosed by way of illustration, comprises an annular sealing member positionable over the ends of the splines of either the spline shaft or the spline fitting to provide a compressible bearing surface for each surface of the shaft and fitting splines. However, it is to be understood that while this invention is herein described as a spline coupling seal, the scope thereof is not limited to splines, but may, by slight modification be adapted for performing other sealing functions such as on irregularly shaped shafts, flexible couplings, and the like.

Figure 1:
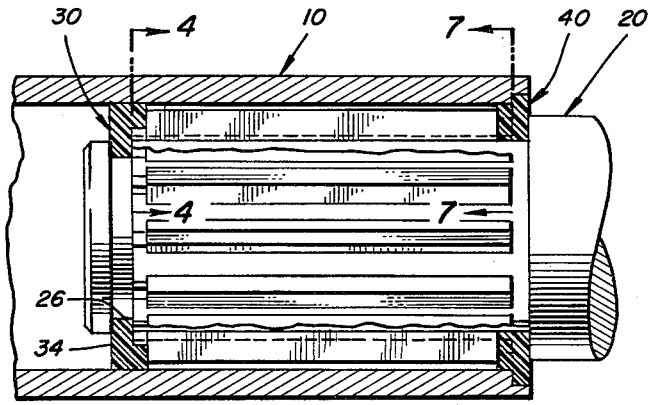
FIG. 1 is a longitudinal sectional view of a spline coupling with the shaft being shown in elevation.

Referring to the drawings and more particularly to FIG. 1 a spline fitting 10 is telescoped over a spline shaft 20 in normal operating position. The seal 30 is placed on the spline shaft over the ends of the shaft splines 21 so as to be located between and in contact with the top and bottom lands, 12 and 13, and faces 14 of the fitting splines 11 and the bottom lands 22 of the shaft splines 21. As will be discussed hereinafter, a seal 40 may be placed within the opening of the fitting 10 over the fitting splines 11 for engagement with the shaft splines 21 when the shaft and fitting are properly located for power transmittal.

Figure 2:
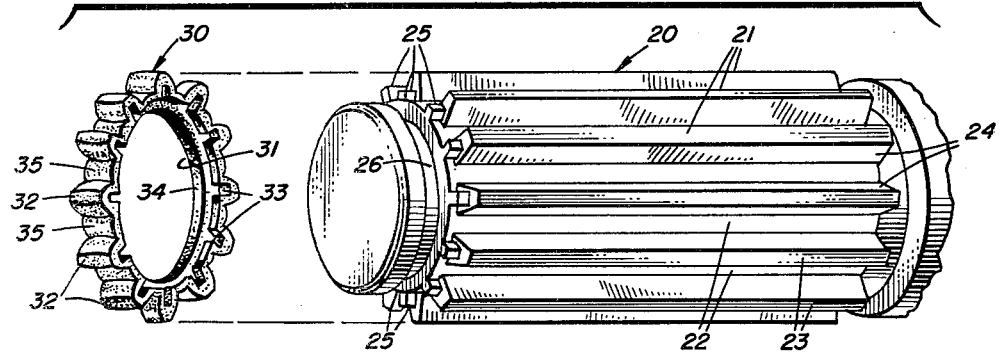
FIG. 2 is an exploded perspective view of a typical spline shaft and associated sealing member shown in approximate aligned relationship.

The shaft seal 30 for straight splines, FIG. 2, generally resembles a spur gear in configuration having a centered orifice 31 to receive the shaft and an array of full depth teeth 32 around its periphery complementary to the fitting splines.

Because of the slight clearance between the shaft splines 21 and adjacent fitting splines 11, it is preferable to cut down the ends of the shaft splines along their top lands 23 and faces 24 in the region of the seal as shown in FIG. 2. The boss 25 thus formed extends from the ends of each full depth spline. This will permit the material of the seal 30, which is between the faces and lands of adjacent shaft and fitting splines, to be of sufficient thickness to allow compression between the spline surfaces without promoting overrun beyond the elastic limit of the material due to excessive pressure. As an alternative, the ends of the fitting splines could be cut down instead of the shaft splines with similar results. Suitable shaping of the spline ends may be accomplished by the electrical discharge method of machining, or by any other manner as will occur to those skilled in the art.

Each tooth 32 of the seal is provided with a recess 33 to receive the boss 25 as shown in FIGS. 1 and 2. The recess should be slightly undersized with reference to the boss, thus providing a press fit. In addition, the exterior dimensions of the seal teeth are sufficiently greater than the shaft spline dimensions, FIGS. 5 and 6, so as to require a press fit between adjacent spline faces 14 and the top and bottom lands 12 and 13 of the fitting splines. FIG. 4 shows the configuration of the seal before assembly in dotted lines. Proper sealing is obtained by providing all sealing surfaces of the seal with a curved configuration in the direction of sealing so as to produce a barrier to the flow of lubricant. The most effective sealing may often be obtained by a continuous circumferential surface contact between the seal and splines of a width less than the full surface width of the seal. It has been found that full width surface contact of the seal and associated spline surfaces may promote overrun and subsequent failure of the seal due to the varying pressures imposed upon the seal when in use. FIGS. 2, 3, 5, 6, and 8 show some of the curved surfaces of the seal and are intended to be illustrative of the curved nature of all sealing surfaces. FIGS. 5 and 6 show the curvature of top lands 36 and of body surface 37. FIG. 8 shows the curvature of one face 38 of the seal and a portion of the continuous circumferential contact surface between the seal and splines. The provision of a press fit insures compressive loading of the seal and splines thereby preventing vibration and loss of lubricant, as well as promoting proper alignment.

The body 34 of the seal, comprising the seal material between the orifice 31 and the bottom lands 35 of the seal, must necessarily be of a depth and thickness to give structural integrity to the seal in order to avoid disintegration at high speed and to withstand distortion and compressive loading. It may be necessary to provide a recess 26 of reduced diameter on the shaft adjacent the splines to receive the body 34 of the seal as shown in FIGS. 1, 2, 5 and 6. Obviously the body size may be varied depending upon the qualities of the seal materials as well as by the use of cords, wire and the like embedded in the body, as may be desirable.

Figure 3:
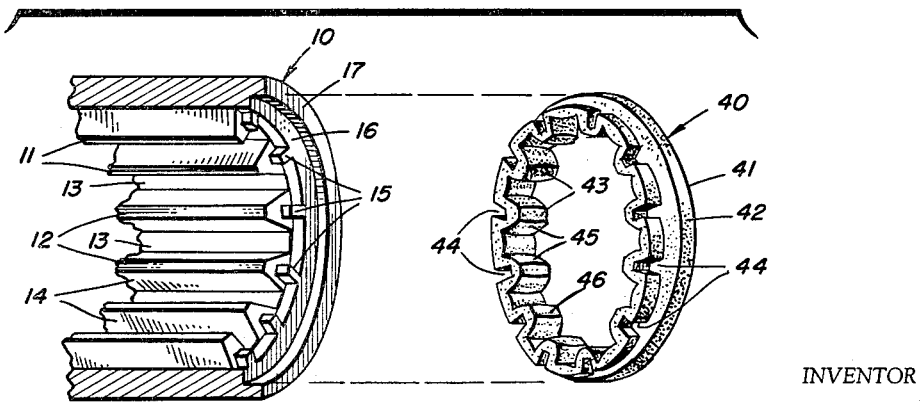
FIG. 3 is an exploded perspective view of a fragmentary portion of a spline fitting and associated sealing member shown in approximate aligned relationship.

As set forth herein above, the seal may be adapted to fit within the opening of the fitting (FIGS. 3 and 7). This design is of particular value for use on the blind end 27 of a spline shaft where machining of the shaft splines, as well as proper positioning of the seal, would be difficult. For this application, the faces 14 and top lands 12 of the fitting splines are cut down to form bosses 15 in a manner similar to the shaft splines discussed above, in order to provide adequate seal material for compression between adjacent shaft and fitting splines. In addition, a recess 16 may be provided in the end face 17 of the fitting 10 to receive the body 41 of the seal 40 and to allow adequate seal body size.

The seal has an annular outer periphery 42 engageable with the recess 16 in the end face of the fitting, and an array of inwardly protruding teeth 43 corresponding to the fitting splines 11. The teeth are of sufficient length to fully extend over the bosses 15, and are provided with appropriate recesses 44 to receive the bosses 15. The recesses are undersize, with reference to the bosses, thus providing a press fit. Similarly, the faces 45 and top lands 46 of the teeth 43 are of slightly greater dimensions than the fitting splines to provide a press fit of the seal 40 between the shaft and fitting splines. Curvature of all sealing surfaces in the direction of sealing is provided on this seal in a manner similar to the curvatures disclosed hereinbefore with regard to the shaft seal. Thus, the desired lubricant seal and control of vibration and alignment are affected.

The choice of either the shaft seal 30 or the fitting seal 40 is dependent upon ease of installation and replacement of the seals in any given coupling application. Any suitable "O" ring material such as polytetrafluoroethylene or similar polymers may be used. The selection may be contingent upon the spline coupling environment, such as fuels, oils, hydraulic fluids or atmosphere.

To assemble a spline coupling utilizing the instant invention, a seal 40 is first placed in one end of the fitting 10. The fitting is then pressed over the shaft splines 21, seal end first. When the fitting has been properly positioned, the desired lubricant is injected into the coupling and a shaft seal 30 is pressed into the other end of the coupling to complete the assembly. Although the use of one shaft seal and one fitting seal was described herein, it is intended that any combination of shaft and fitting seals may be utilized depending upon the type of coupling and ease of installation.

It will thus be seen that the invention accomplishes its objects and while it has herein been disclosed by reference to the details of specific embodiments, it is understood that such disclosure is intended in an illustrative, rather than limited sense, as it is contemplated that various modifications in the construction of the device will readily occur to those skilled in the art, within the spirit of the invention and the scope of the appended claims.

What is claimed is:

1. A sealing device for a spline coupling of the type having a spline shaft and spline fitting comprising an annular body, said body having an orifice therethrough to receive the shaft, means on said body extending axially therefrom for protruding between and engaging the surfaces of said shaft and fitting along only a portion of their common axial length thereby sealing the spaces between said shaft and fitting and providing an enclosed cavity therebetween defined by the shaft, fitting and seal so that lubricant between said shaft and fitting surfaces is retained, said means being compressible protrusions, said protrusions having a shape corresponding to the spline configuration of one of said shaft and fitting, and each protrusion having a recess to receive a portion of the other of said shaft and fitting spline whereby said seal is positionable around said shaft and over portions of the spline of the other of said shaft and fitting thereby preventing misalignment of said shaft and fitting.

2. The device according to claim 1 wherein said compressible protrusions are of greater size than said splines whereby the surfaces of the splines on the other of said shaft and fitting are engaged under pressure thereby effecting vibration dampening.

3. The device according to claim 2 wherein said body is positionable on said fitting and said protrusions are located around said orifice complementary to the positions of said shaft splines.

4. The device according to claim 2 wherein said protrusions are located around the outer periphery of said body complementary to said fitting splines.

References Cited by the Examiner
UNITED STATES PATENTS 2,338,093  1/44  Caldwell.
2,639,496  5/53  Hartzell _____ 64—14 X CARL W. TOMLIN, *Primary Examiner.*

SAMUEL B. ROTHBERG, *Examiner.*